United States Patent
Kobayashi

[11] Patent Number: 6,058,345
[45] Date of Patent: May 2, 2000

[54] METHOD AND APPARATUS FOR CONTROLLING A VEHICLE

[75] Inventor: Hirohisa Kobayashi, Atsugi, Japan

[73] Assignee: Unisia Jecs Corporation, Kanagawa-ken, Japan

[21] Appl. No.: 09/004,732

[22] Filed: Jan. 9, 1998

[30] Foreign Application Priority Data

Jan. 10, 1997 [JP] Japan ................................... 9-003017

[51] Int. Cl.[7] .......................... B60K 41/08; F16H 59/48
[52] U.S. Cl. ................................ 701/51; 701/95; 701/53; 701/84; 477/45; 477/48; 477/50; 477/80; 477/115; 477/156
[58] Field of Search ................................ 701/51, 53, 95, 701/84; 477/45, 48, 80, 115, 156, 50

[56] References Cited

U.S. PATENT DOCUMENTS

| | | | |
|---|---|---|---|
| 5,730,680 | 3/1998 | Toukura | 477/46 |
| 5,771,171 | 6/1998 | Tazawa | 701/51 |
| 5,848,370 | 12/1998 | Kozaki et al. | 701/51 |
| 5,928,301 | 7/1999 | Soga et al. | 701/51 |

FOREIGN PATENT DOCUMENTS

| | | |
|---|---|---|
| 5-321707 | 12/1993 | Japan . |
| 6-129273 | 5/1994 | Japan . |

*Primary Examiner*—William A. Cuchlinski, Jr.
*Assistant Examiner*—Olga Hernandez
*Attorney, Agent, or Firm*—McDermott, Will & Emery

[57] ABSTRACT

In an engine provided with a throttle valve actuator which controls the opening/closing of the throttle valve, a target throttle valve opening degree is determined based the amount of accelerator pedal depression. Following a speed change command being issued in an automatic transmission the target throttle position is gradually decreased until an inertial phase is detected. The target throttle opening is then returned to that which corresponds to the accelerator pedal depression by the driver. More specifically, a method of controlling a vehicle features: a speed change requirement detection which detects a speed change requirement being issued to a transmission; an input torque reduction which reduces the input torque input to the automatic transmission irrespective of the intention of the driver; a gear change period commencement time detection which detects a time corresponding to a speed change engagement commencement time during speed change; and an input torque reduction control completion step which completes the torque reduction control in a manner where, after a speed change requirement is detected, the input torque is reduced by a predetermined amount by the torque reduction step, and a time corresponding to a speed change element engagement commencement timing during speed change is detected by the gear change period commencement detection step.

8 Claims, 8 Drawing Sheets

TVO_REF1 COMPUTATION

TVODWN, TVODDWN COMPUTATION

METHOD AND APPARATUS FOR CONTROLLING A VEHICLE

BACKGROUND OF THE INVENTION

1. Field of the Invention

The present invention relates to a control method and apparatus for improving the speed change characteristics of a vehicle fitted with an automatic transmission.

2. Description of the Related Art

Heretofore, at the time of speed change of a vehicle automatic transmission, the engine torque is reduced by for example, reducing or stopping the fuel supply, retarding the ignition timing, reducing the intake air flow quantity by automatic opening control of the throttle valve (increasing the intake air resistance), or a combination of these, to thereby suppress the rapid change in torque of the transmission output shaft at the time of speed change, and hence alleviate speed change shock. The period for carrying out this torque down control should be the period where the speed change operation is actually being carried out, after the torque speed change has been transmitted (after lapse of the torque phase) after commencement of the primary speed change operation. Here, due to the start and stop operation of the speed change elements due to the speed change, the time when the speed change operation is being carried out can be considered as the period from when the speed change ratio between the output shaft of the automatic transmission and the turbine shaft (ie. the input shaft) of the torque converter starts to change from the gear ratio prior to speed change until this drops to the new gear ratio after completion of the speed change. This speed change operation period is referred to as the inertial phase (gear change period).

As conventional technology related to the above torque down control, there is the arrangement disclosed in Japanese Unexamined Patent Publication No. 5-321707.

With this arrangement, the throttle valve opening can be controlled automatically irrespective of the intention of the driver (for example the accelerator opening). As shown by the full line in FIG. 8, during the torque phase the throttle valve opening is increased by a predetermined amount, while during the inertial phase the throttle valve opening is decreased by a predetermined amount, thereby reducing the speed change shock. However, the torque phase and the inertial phase are detected by elapsed time from the time of a speed change requirement.

Moreover, with the arrangement as disclosed in Japanese Unexamined Patent Publication No. 6-129273, the throttle valve opening can be controlled automatically irrespective of the intention of the driver (for example the accelerator opening). As shown by the full line in FIG. 9, during the inertial phase the throttle valve opening is decremented to thereby effect a reduction in speed change shock. However the inertial phase is detected based on the speed change ratio between the output shaft of the automatic transmission and the turbine shaft (ie. the input shaft) of the torque converter.

With the abovementioned arrangements disclosed in Japanese Unexamined Patent Publication Nos. 5-321707 and 6-129273, there are the following concerns.

In general, the shorter the speed change time and the smaller the torque difference at the time of speed change completion the less the speed change shock, resulting in good speed change characteristics, but to achieve this, the torque down amount during the inertial phase must be made quite large. However if the torque down amount is made large, then when the throttle valve opening returns to the target opening for normal operation after completion of the inertial phase, since there is also a limit to the responsiveness of the throttle valve operation, then the return time is increased with the increase in the torque down amount. Hence a torque pull (a drop) occurs after completion of the inertial phase, so that speed change shock is increased. The driver is therefore likely to experience a different sensation (refer to the chain lines in FIG. 8 and FIG. 9).

With the above problem, even in the case where the torque down control is carried out by other methods (control of fuel supply quantity or ignition timing and the like), due to the response delay, the problem similarly arises.

SUMMARY OF THE INVENTION

Taking into consideration the above conventional situations, it is an object of the present invention to provide a method and apparatus for controlling a vehicle such that with an arrangement wherein torque down control is carried out during speed change, a significant improvement in speed change characteristics can be achieved by taking into consideration the responsiveness of the torque down control.

Accordingly, the method and apparatus according to the present invention for controlling a vehicle incorporating an automatic transmission connected to an output shaft of an engine comprises:

- a speed change requirement detection step or device for detecting a speed change requirement to the automatic transmission connected to the output shaft of the engine;
- an input torque reduction step or device which can reduce the input torque for input to the automatic transmission irrespective of the intention of a driver;
- a gear change period commencement time detection step or device for detecting a time corresponding to a speed change element engagement commencement time during speed change; and
- an input torque reduction control completion step or device which completes reduction control of the input torque by said input torque reduction step or device when after a speed change requirement has been detected by said speed change requirement detection step or device, the input torque has been reduced by a predetermined amount by said input torque reduction step or device, and a time corresponding to a speed change element engagement commencement time during speed change is detected by said gear change period commencement time detection step or device.

With such a construction, after a speed change requirement (for example a speed change judgment or a speed change command to the automatic transmission) is detected, the input torque is reduced by a predetermined amount by the input torque reduction step or device, and when a time corresponding to the speed change element engagement commencement time during speed change is detected, the reduction control of the input torque by said input torque reduction step or device is completed. Therefore even if there is a response delay (operational delay etc.) in the input torque reduction step or device, or even if the reduction amount (torque down amount) of the input torque is made sufficiently large, when the gear change period (inertial phase) is completed, the input torque is set based on the intentions of the driver so that control to the target input torque is then possible (returns to normal control). Consequently it is possible to reliably eliminate the heretofore large speed change shock due to the occurrence of torque pull attributable to the response delay of the input torque reduction step or device after completion of the gear change period and resulting in the likelihood of a different feeling being transmitted to the driver.

That is to say, with the present invention, in carrying out torque down control during speed change, the responsiveness of the torque down control is considered, and the return of the torque down control to normal control is smoothly carried out. Therefore good speed change control can be achieved with only minimal speed change shock. Furthermore since the speed change shock is reduced, the endurance of the respective speed change elements can be improved.

The construction may be such that the input torque reduction step or device includes; an input torque decrementing step or device for decrementing the input torque gradually from when a speed change requirement is detected by said speed change requirement detection step or device until a time corresponding to the speed change element engagement commencement time during speed change is detected by said gear change period commencement time detection step or device.

If when a speed change requirement (a speed change judgment or a speed change command to the automatic transmission) is detected, the input torque is immediately reduced by a large amount, then there is the possibility of a certain amount of speed change shock after commencement of the input torque reduction control (immediately after detecting speed change requirements). However with the above arrangement, this can be reliably eliminated.

Moreover the construction may be such that the input torque reduction step or device is a step or device which reduces the input torque by controlling the engine intake air resistance.

With such an arrangement the construction can be simplified and control accuracy improved. Moreover, since for example the air-fuel ratio of the engine intake mixture can be maintained at a predetermined value, and since the combustion conditions of the engine are not deteriorated, then even if reducing the input torque, the degrading influence on the exhaust performance and fuel consumption can be suppressed to the maximum.

Furthermore the construction may be such that the gear change period commencement time detection step or device detects a time corresponding to the speed change element engagement commencement time during speed change based on at least one parameter of; throttle valve opening, engine rotational speed, automatic transmission output shaft rotational speed, vehicle speed, and elapsed time from detecting a speed change requirement.

In this way, the time corresponding to the speed change element engagement commencement time during speed change can be detected with good accuracy and with a comparatively simple construction.

Other objects and aspects of the present invention will become apparent from the following description of embodiments, given in conjunction with the appending drawings.

DESCRIPTION OF THE PREFERRED EMBODIMENT

Figure 1:
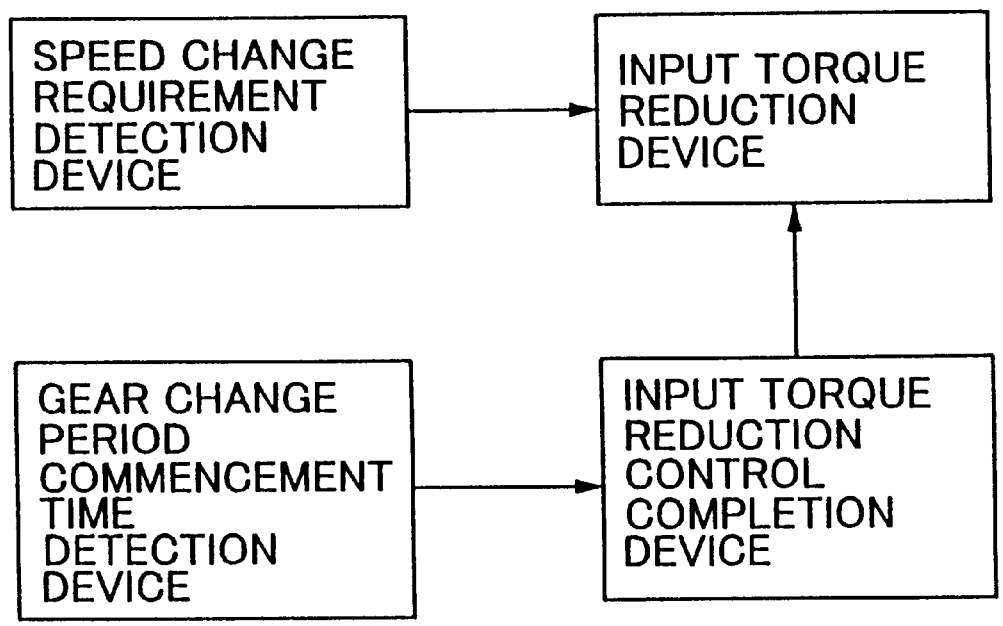
FIG. 1 is a block diagram illustrating a construction of the present invention.

As follows is a detailed description based on the appended drawings, of one embodiment of the present invention having a basic construction as shown in FIG. 1.

Figure 2:
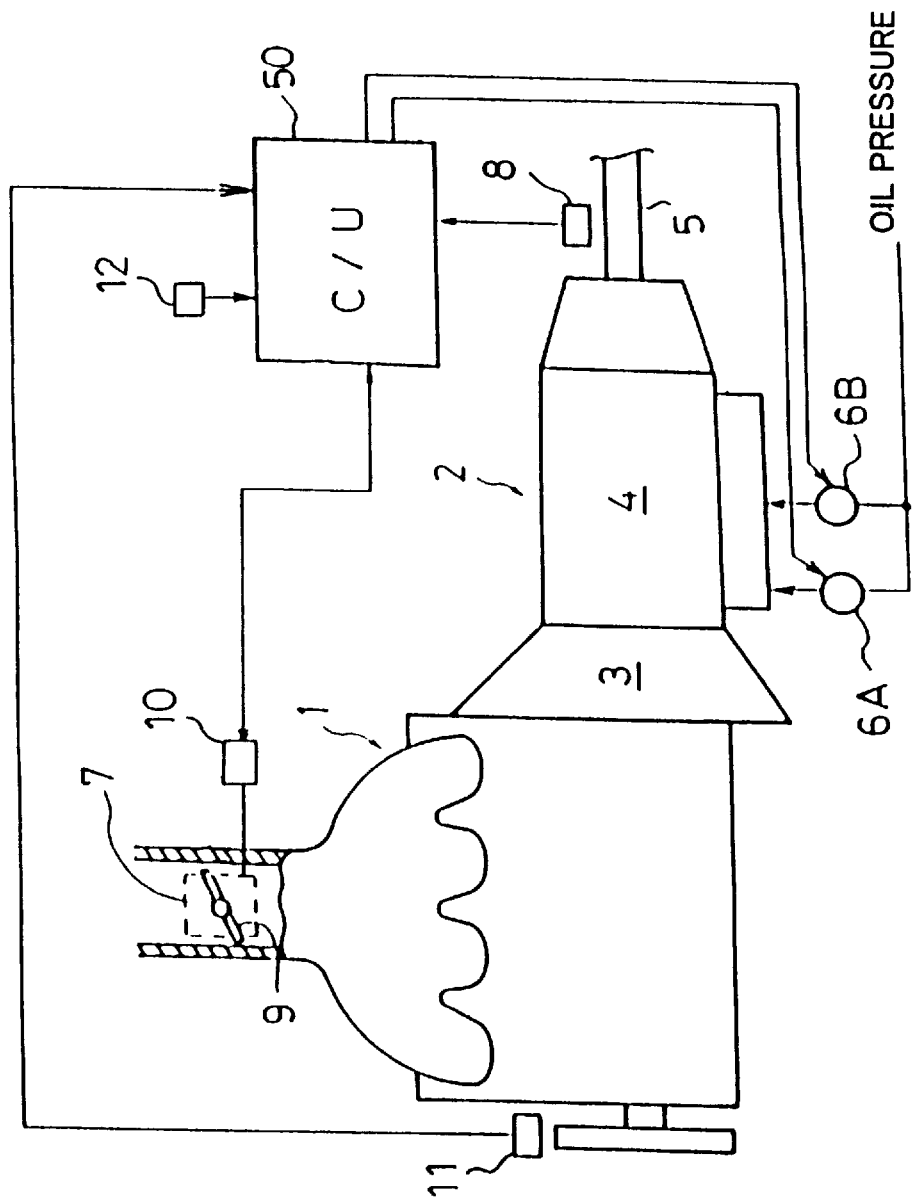
FIG. 2 is an overall system structural diagram of one embodiment of the present invention.

With the embodiment of the present invention, as shown in FIG. 2, an engine 1 is connected to an automatic transmission 2 so that the generated torque is transmitted to a vehicle drive wheel (not shown in the figure). The automatic transmission 2 comprises a torque converter 3 into which the generated torque of the engine 1 is input via a fluid, a multi step type speed change gear mechanism 4 which takes the output from the torque converter 3 and outputs this after a speed change, and a hydraulic mechanism (not shown in the figure) for driving these.

Solenoid valves 6A, 6B are assembled into the hydraulic mechanism of the speed change gear mechanism 4. The operating oil pressure is controlled by switching the open and close combinations of the solenoid valves 6A, 6B thereby changing the clamp-release combinations of respective clutches housed in the speed change gear mechanism 4, to effect speed change to a desired speed change step (speed change ratio).

ON/OFF control of the solenoid valves 6A, 6B is carried out based on a control signal from a control unit 50 which comprises a CPU, ROM, RAM, A/D converter and input/output interface and the like.

With the embodiment of the present invention, there is provided a throttle actuator 10 which can control a throttle valve 9 for adjusting the output torque of the engine 1 (engine intake air quantity, or intake air resistance) independent of accelerator operation by the driver. The throttle actuator 10 is driven and controlled by signals from the control unit 50.

Signals from various sensors are input to the control unit 50.

For the various sensors there is provided for example the following devices.

That is, there is provided a throttle sensor 7 for generating an output signal corresponding to an opening TVO of the throttle valve 9, and an accelerator sensor 12 for detecting an amount that the accelerator is pressed by the driver (accelerator opening).

Moreover, there is provided an output shaft rotational speed sensor 8 for detecting a rotational speed No of an output shaft 5 of the automatic transmission 2. The signal from the output shaft rotational speed sensor 8 is a pulse signal for each predetermined rotation angle, which is generated using a gear tooth or a slot cut in a rotation body connected to the output shaft 5. The output shaft rotational speed No is computed from the generation period of this pulse signal. The output shaft rotational speed sensor 8 can also detect vehicle speed VSP from the relationship between the output shaft rotational speed No and the final speed reduction ratio and wheel diameter. That is to say, this also functions as a vehicle speed sensor.

Furthermore, there is provided a crank angle sensor 11 on the crank shaft of the engine 1, or on a shaft which rotates in synchronous with this. The signal from the crank angle sensor 11 is a pulse signal for each predetermined crank angle, which is generated by means of a disc having outer peripheral slots (or holes) provided for each predetermined crank angle, and linked to the crank shaft rotation. The engine rotational speed Ne is computed from the generation period of this pulse signal.

The control unit 50 automatically sets the speed change ratio (or speed change step), corresponding to the throttle valve opening TVO (or accelerator opening) and the vehicle speed VSP, and carries out automatic speed change control to control the gear type speed changer 4 to this speed change ratio (speed change step) by ON/OFF control of the solenoid valves 6A, 6B.

Moreover, the control unit 50 is able to correct the engine torque by carrying out torque down control, that is automatically controlling the opening of the throttle valve 9 via the throttle actuator 10, so as to alleviate the speed change shock attributable to the speed change operation. It is also possible to have a construction wherein torque down control is carried out by controlling the fuel supply quantity, or controlling the ignition timing or the like.

With the torque down control of the present embodiment, the responsiveness of the torque down control (for example the operational response delay of the throttle valve) can be taken into consideration, so that even better speed change characteristics can be achieved.

Figure 3:
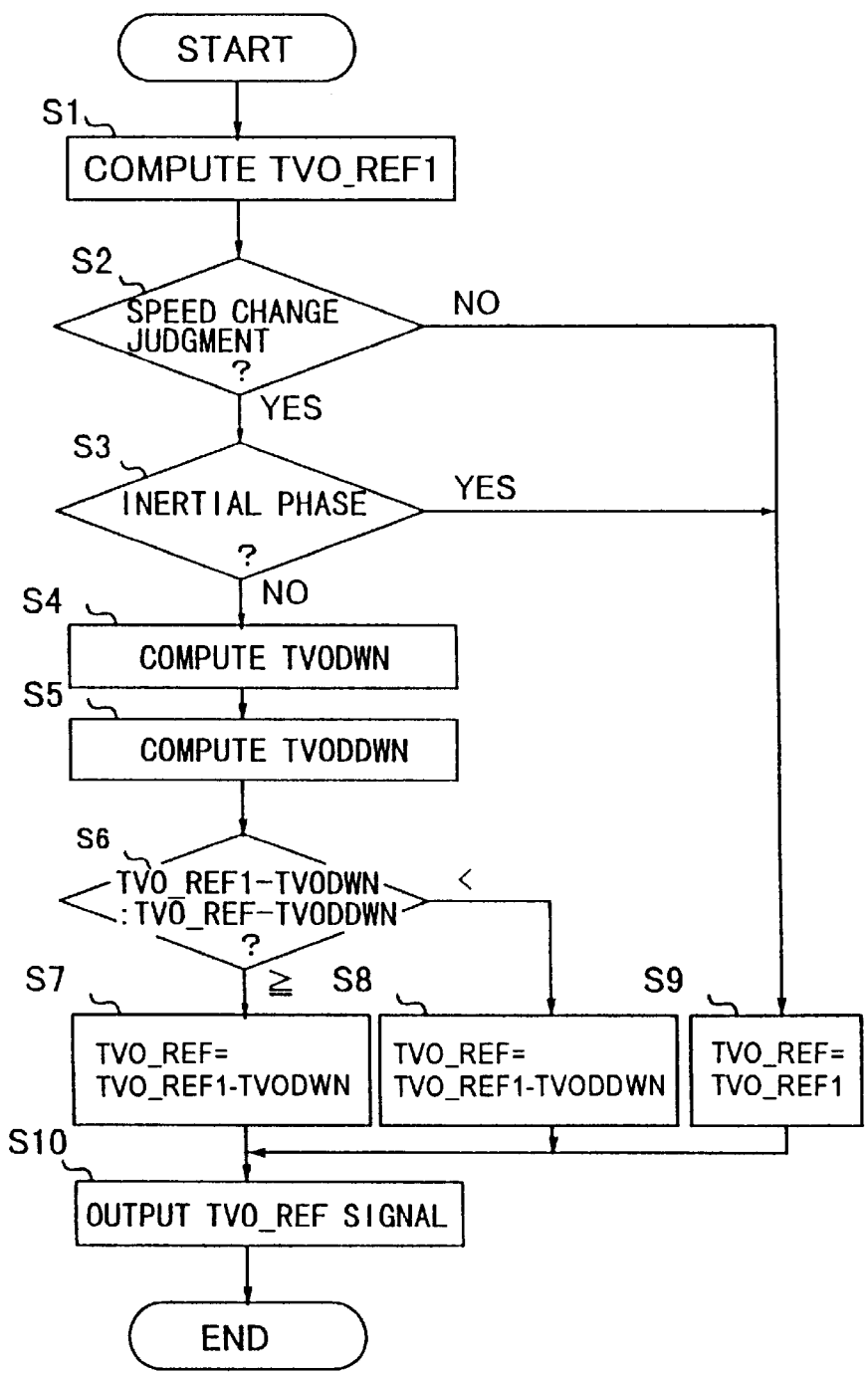
FIG. 3 is a flow chart for explaining a torque down control routine of the embodiment.

Next is a description with reference to the flow chart of FIG. 3, of the torque down control routine carried out by the control unit 50 which incorporates as software, the functions according to the present invention of; the speed change requirement detection step or device, the input torque reduction step or device, the gear change period commencement time detection step or device, and the input torque reduction control completion step or device.

Figure 4:
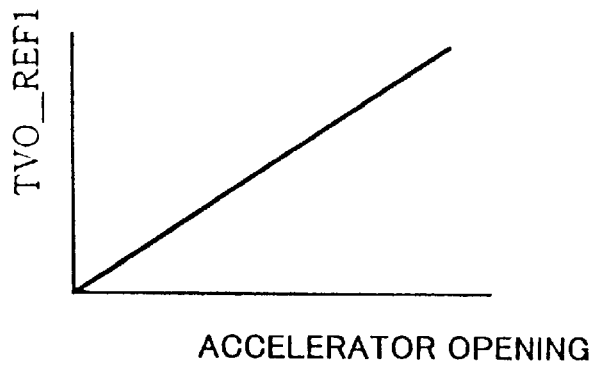
FIG. 4 is an example of a table for setting target throttle opening (TVO_REF1)

In step 1 (abbreviated to S1 in the figures, and so on), a target throttle opening (TVO_REF1) is computed (or set). This target throttle opening (TVO_REF1) can be computed (or set) by referring to the table of FIG. 4, based for example on the amount that the accelerator peddle is pressed by the driver (accelerator opening).

In step 2, speed change judgment (speed change requirement detection) is carried out. This can involve referring to a speed change pattern (speed change map, speed change line) which has been previously set based for example on the throttle valve opening TVO (or accelerator opening) and the vehicle speed VSP, and making a judgment (speed change requirement detection) based on whether or not there is a speed change requirement for the speed change ratio (or speed change step). Furthermore, judgment can also be made based on a so-called speed change judgment flag which is set corresponding to the presence or absence of a speed change requirement for the speed change ratio (or speed change step). Alternatively judgment can be made based on an operation of the driver to change the gear shift position.

If YES, control proceeds to step 3, while if NO, control proceeds to step 9.

Figure 7:
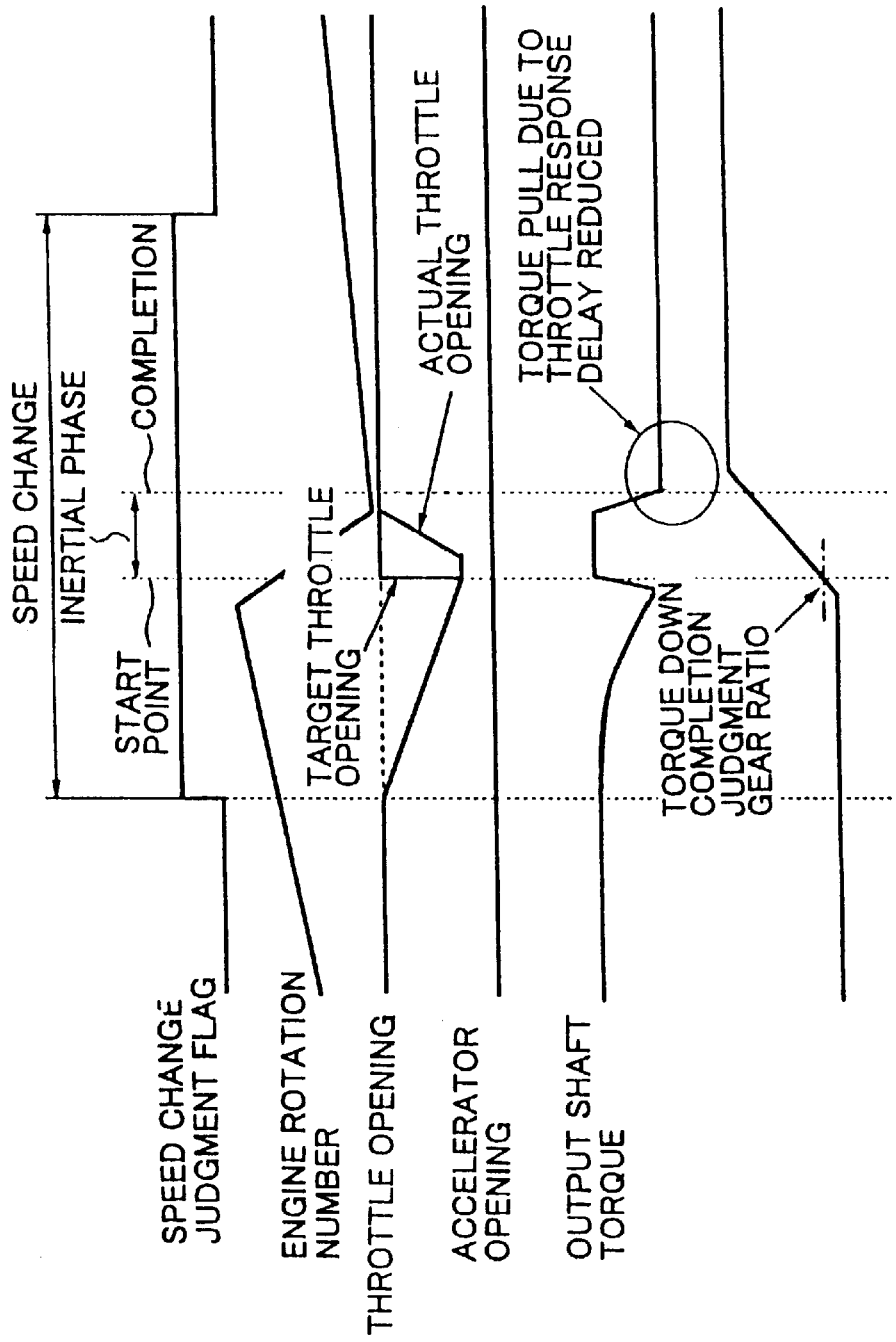
FIG. 7 is a time chart for explaining operational results due to the torque down control of the present invention.
Figure 8:
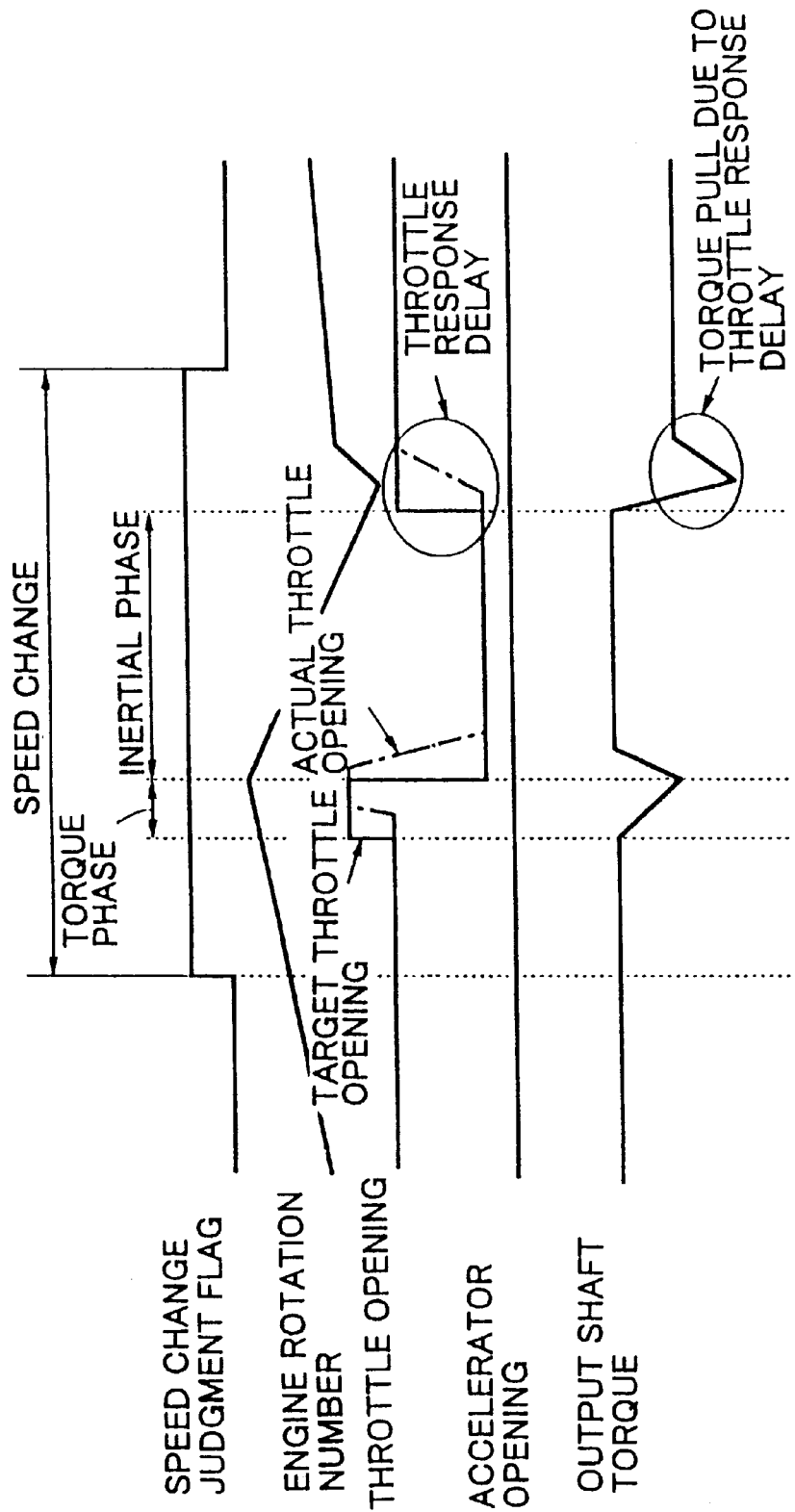
FIG. 8 is a time chart for explaining torque down control of a conventional apparatus (Japanese Unexamined Patent Publication No. 5-321707)
Figure 9:
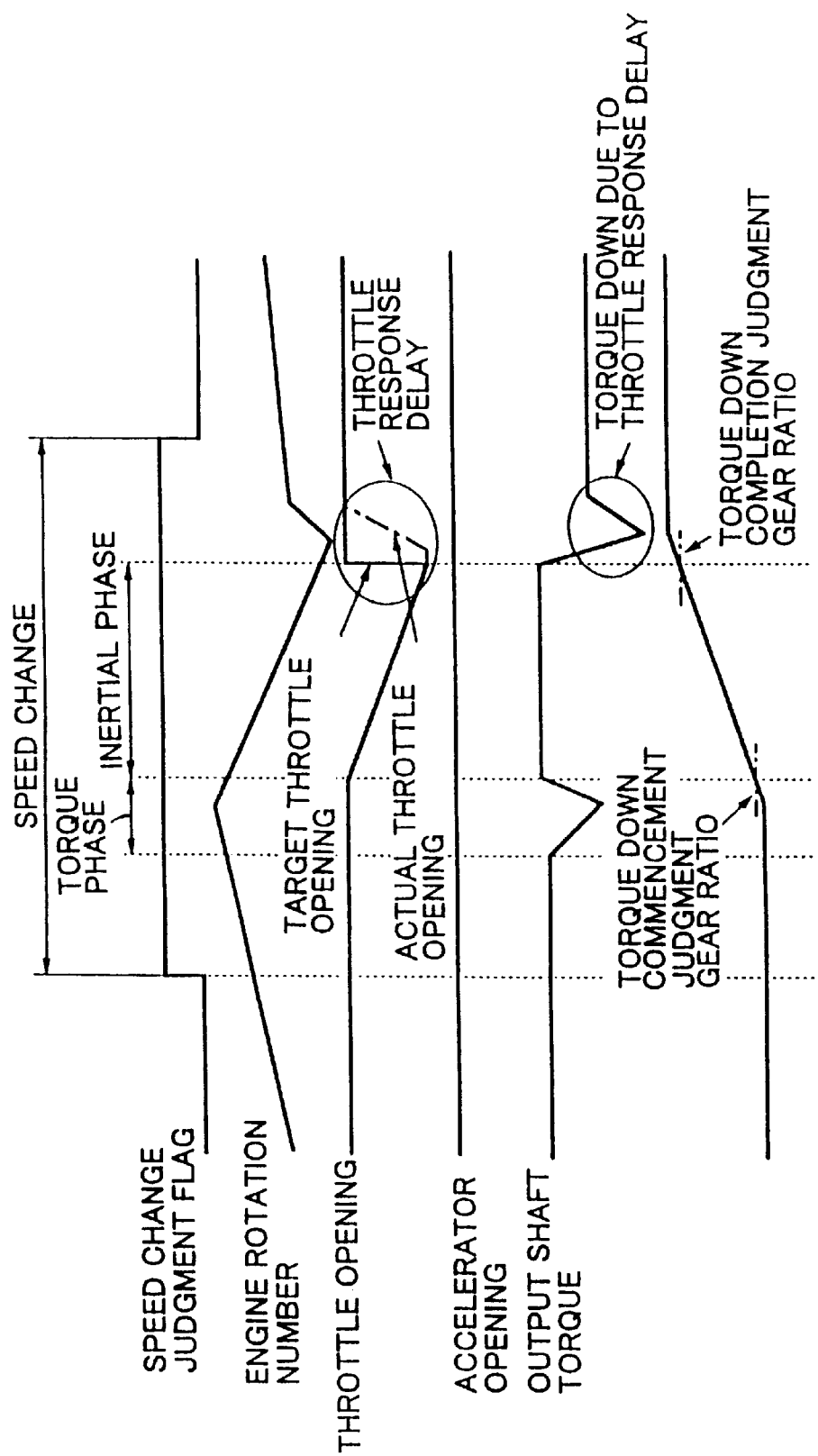
FIG. 9 is a time chart for explaining torque down control of a conventional apparatus (Japanese Unexamined Patent Publication No. 6-129273).

In step 3, it is judged if conditions are for the start point of the gear change period (inertial phase) (detection of whether or not the time corresponds to the speed change element engagement commencement time during speed change). This judgment can be carried out by conventional methods. For example, as shown in FIG. 7, this can be judged based on the speed ratio (gear ratio) of the automatic transmission output shaft rotational speed No (or the vehicle speed VSP) and the turbine shaft rotational speed of the torque converter 3 (this can be detected directly by a sensor or the like, or detected based on the engine rotational speed Ne and a slip ratio). Moreover, this can be carried out based on the engine rotational speed Ne which is computed based on the pulse signal from the crank angle sensor 11. Alternatively, this can be judged based on an elapsed time from when the speed change requirement is detected. Furthermore, this can be judged based on the opening of the throttle valve 9 due to the reduction control of the throttle valve opening (to be described later) attaining a predetermined opening, or based on the operating oil pressure applied to the hydraulic mechanism.

If YES (inertial phase start point), control proceeds to step 9, while if NO (if the inertial phase start point has not been reached), control proceeds to step 4.

Figure 5:
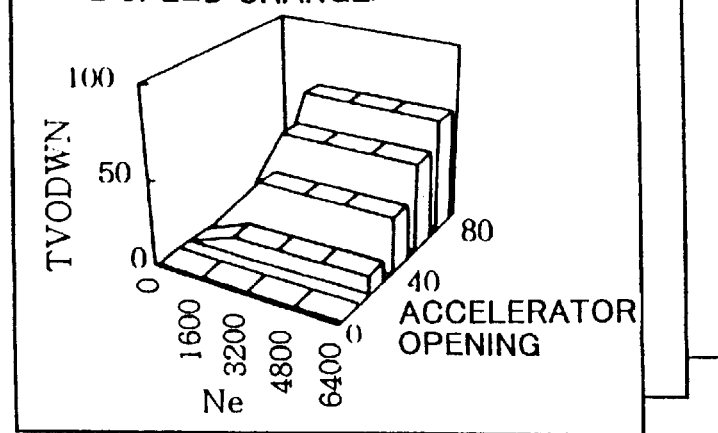
FIG. 5 is an example of a target torque down amount (TVODWN) setting table and a throttle decrement amount (TVODDWN) setting table.

In step 4, a target torque down amount (TVODWN) is computed (or set). This can be computed (or set) by referring for example to a target torque down amount (TVODWN) setting map which is set for each speed change requirement as shown in FIG. 5, based on the accelerator opening and the engine rotational speed Ne.

Then in step 5, a throttle decrement amount (TVODDWN) is computed (or set). This throttle decrement amount (TVODDWN) can also be computed (or set) by referring to a throttle decrement amount (TVODDWN) setting map which is set for each speed change requirement as shown in FIG. 5, based on the accelerator opening and the engine rotational speed Ne.

In step 6, {the target throttle opening (TVO_REF1)—the target torque down amount (TVODWN)} and {a currently set throttle opening (TVO_REF; an actual measured value is also suitable)—the throttle decrement amount (TVODDWN)) are compared.

If {the target throttle opening (TVO_REF1)—the target torque down amount (TVODWN), that is, the final target throttle opening}<{the currently set throttle opening (TVO_REF)—the throttle decrement amount (TVODDWN)}, that is the case where in the current step it is not yet possible to torque down to the final target, then the currently set throttle opening (TVO_REF) must be decremented by the predetermined throttle decrement amount (TVODDWN) (in other words the current throttle opening must be decremented gradually in a predetermined trend until the final target), and control thus proceeds to step 8. In step 8 processing is carried out so that TVO_REF=TVO_REF-TVODDWN.

On the other hand, if {the target throttle opening (TVO_REF1)—the target torque down amount (TVODWN)}≧{the currently set throttle opening (TVO_REF)—the throttle decrement amount (TVODDWN)}, that is if torque down has already been carried out to the final target, then in order to maintain the currently set throttle opening (TVO_REF) at the final target throttle opening {that is, the target throttle opening (TVO_REF1)—the target torque down amount (TVODWN} which can achieve the target torque down amount, control proceeds to step 7. In step 7 processing is carried out so that TVO_REF= TVO_REF1-TVODWN.

Incidentally, when after speed change judgment (after speed change command), inertial phase start is detected, then in step 3, control proceeds to step 9. In step 9, the throttle opening is returned to the target throttle opening (TVO_REF1) based on the accelerator operation of the driver (TVO_REF=TVO_REF1).

Figure 6:
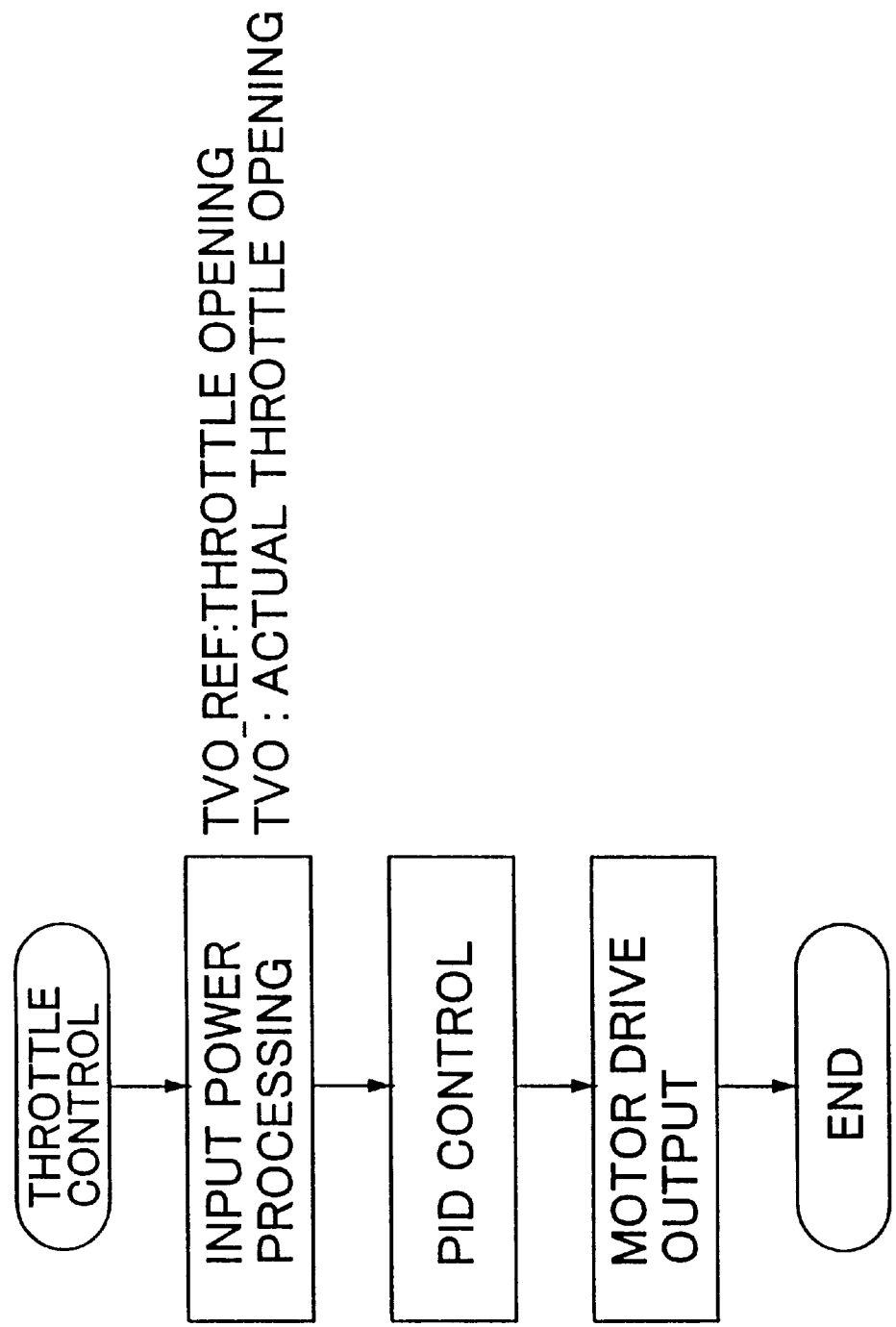
FIG. 6 is a flow chart for explaining an automatic throttle opening control routine.

In step 10, a TVO_REF signal is transmitted to the throttle actuator 10 (motor) in order to control by PID (proportional-integral) control, the actual opening (TVO) of the throttle valve 9 to the throttle opening (TVO REF) set in step 7, step 8 or step 9, after which the throttle valve is returned. Basically, this is carried out for example by the flow chart of FIG. 6.

In this way, with the present embodiment, after the speed change judgment (after speed change command), the currently set throttle opening (TVO_REF) is gradually decremented to a final target by predetermined throttle decrement amounts (TVODDWN), and also, from after inertial phase commencement is detected after speed change judgment (after speed change command), the throttle opening is returned to the target throttle opening (TVO_REF1) which is based on the accelerator operation of the driver.

Therefore, even if there is an operational delay (response delay) in the throttle valve 9, or even if the torque down amount is sufficiently large, then at the time of completion of the inertial phase, the throttle opening can be controlled to the target throttle opening which is based on the accelerator operation of the driver. Therefore the possibility as with the conventional arrangement of the occurrence of a torque pull after completion of the inertial phase and an increase in speed change shock so that the driver is subjected to a different feeling, can be reliably eliminated (refer to the full line in FIG. 7).

That is to say, with the present embodiment, responsiveness of the torque down control in the case where torque down control is carried out during speed change is taken into consideration so that restoration of the torque down control to the normal control is smoothly carried out. Hence good speed change characteristics with minimal speed change shock can be achieved. Moreover, since the speed change shock is reduced, then the endurance of the respective speed change elements can be improved.

When as shown in step 6 to step 8, after speed change judgment (after speed change command) the currently set throttle opening (TVO_REF) is gradually decremented by the predetermined throttle decrement amount (TVODDWN), it is preferable that the currently set throttle opening (TVO_REF) does not go below the final target throttle opening {that is, the target throttle opening (TVO_REF1)—the target torque down amount (TVODWN} which can achieve the target torque down amount, so that the occurrence of speed change shock resulting from excessive torque down is prevented.

Now with the above embodiment, the explanation has been for where torque down control is carried out by means of throttle opening control. However the invention is not limited to this. For example, in the case of a construction wherein torque down control is carried out by means of fuel supply quantity control or ignition timing control or the like during speed change, the occurrence of speed change shock due to the torque pull on completion of the inertial phase, occurring as a result of the response delay of the fuel supply quantity control or the ignition timing control, can also be suppressed by the present invention.

What is claimed is:

1. A method of controlling a vehicle comprising:
   a speed change requirement detection step for detecting a speed change requirement to an automatic transmission connected to an output shaft of an engine;
   an input torque reduction step which can reduce the input torque for input to the automatic transmission irrespective of the intention of a driver;
   a gear change period commencement time detection step for detecting a time corresponding to a speed change element engagement commencement time during speed change; and
   an input torque reduction control completion step which completes reduction control of the input torque by said input torque reduction step when after a speed change requirement has been detected by said speed change requirement detection step, the input torque has been reduced by a predetermined amount by said input torque reduction step, and a time corresponding to a speed change element engagement commencement time during speed change is detected by said gear change period commencement time detection step.

2. A method of controlling a vehicle according to claim 1, wherein said input torque reduction step includes; an input torque decrementing step for decrementing the input torque gradually from when a speed change requirement is detected by said speed change requirement detection step until a time corresponding to the speed change element engagement commencement time during speed change is detected by said gear change period commencement time detection step.

3. A method of controlling a vehicle according to claim 1, wherein said input torque reduction step is a step which reduces the input torque by controlling the engine intake air resistance.

4. A method of controlling a vehicle according to claim 1, wherein said gear change period commencement time detection step detects a time corresponding to the speed change element engagement commencement time during speed change based on at least one parameter of; throttle valve opening, engine rotational speed, automatic transmission output shaft rotational speed, vehicle speed, and elapsed time from detecting a speed change requirement.

5. An apparatus for controlling a vehicle comprising:
   speed change requirement detection means for detecting a speed change requirement to an automatic transmission connected to an output shaft of an engine;
   input torque reduction means which can reduce the input torque for input to the automatic transmission irrespective of the intention of a driver;
   gear change period commencement time detection means for detecting a time corresponding to a speed change element engagement commencement time during speed change; and
   input torque reduction control completion means which completes reduction control of the input torque by said input torque reduction means when after a speed change requirement has been detected by said speed change requirement detection means, the input torque has been reduced by a predetermined amount by said input torque reduction means, and a time corresponding to a speed change element engagement commencement time during speed change is detected by said gear change period commencement time detection means.

6. An apparatus for controlling a vehicle according to claim 5, wherein said input torque reduction means includes; an input torque decrementing means for decrementing the input torque gradually from when a speed change requirement is detected by said speed change requirement detection means until a time corresponding to the speed change element engagement commencement time during speed change is detected by said gear change period commencement time detection means.

7. An apparatus for controlling a vehicle according to claim 5, wherein said input torque reduction means is a means which reduces the input torque by controlling the engine intake air resistance.

8. An apparatus for controlling a vehicle according to claim 5, wherein said gear change period commencement time detection means detects a time corresponding to the speed change element engagement commencement time during speed change based on at least one parameter of; throttle valve opening, engine rotational speed, automatic transmission output shaft rotational speed, vehicle speed, and elapsed time from detecting a speed change requirement.

* * * * *